C. P. BYRNES.
THERMOSTATIC CONTROL DEVICE FOR EXPLOSIVE ENGINES.
APPLICATION FILED APR. 2, 1915.
1,189,786.
Patented July 4, 1916.
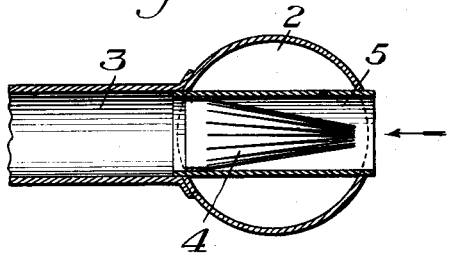
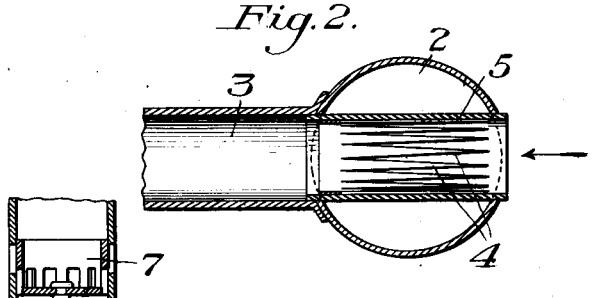
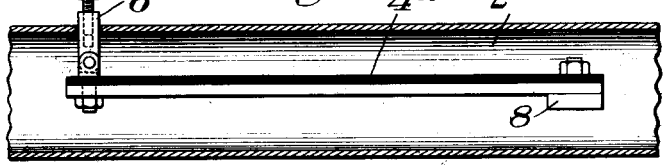
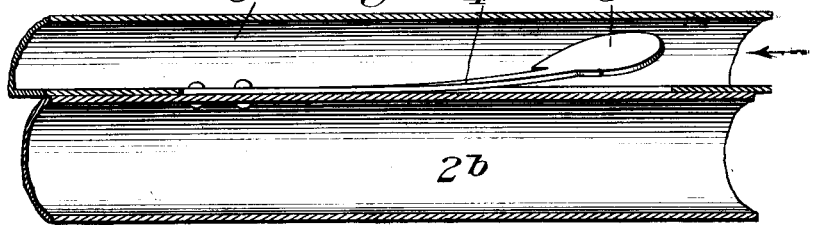
WITNESSES
INVENTOR

UNITED STATES PATENT OFFICE.

CLARENCE P. BYRNES, OF SEWICKLEY, PENNSYLVANIA.

THERMOSTATIC CONTROL DEVICE FOR EXPLOSIVE-ENGINES.

1,189,786.        Specification of Letters Patent.        Patented July 4, 1916.

Application filed April 2, 1915. Serial No. 18,743.

*To all whom it may concern:*

Be it known that I, CLARENCE P. BYRNES, a citizen of the United States, residing at Sewickley, in the county of Allegheny and State of Pennsylvania, have invented a new and useful Improvement in Thermostatic Control Devices for Explosive-Engines, of which the following is a full, clear, and exact description, reference being had to the accompanying drawings, forming part of this specification, in which—

Figure 1 is a diagrammatic sectional view showing one form of my invention; Fig. 2 is a similar view showing the thermostatic throttle heated and opened; Figs. 3 and 4 are diagrammatic views showing modified forms; and Fig. 5 shows the device placed in the water channel from the radiator to the engine.

My invention relates to explosive engines, particularly those using a carbureter, though it may be applied to others. With such engines, a greater proportion of fuel in the mixture is desired for starting them under running conditions, and various devices have been used to accomplish this: for example, special starting feeds, thermostatic control of the carbureter needle valve; auxiliary starting carbureters, etc. Moreover, in a simple jet carbureter, the mixture grows richer under increasing suction of the engine, and special devices, such as auxiliary spring-controlled air valves, dividing the fuel feed, feeding a portion by gravity, etc., have been used to remedy this.

My invention is designed to provide a richer mixture for easy starting, by thermostatic heat control of the air sucked in by the engine, this being preferably the main air passing to the charge former or mixer, though it may control an auxiliary air valve which supplies further air for the mixture. It also tends to correct the undesirable formation of a richer mixture as the suction increases; and may be of simple cheap construction.

In the preferred form, the thermostat is controlled by the heat of the engine exhaust and is not only a thermostat, but also has a valve function, this being obtained by locating a part of the thermostat in the air inlet or mixture inlet flow passage. The thermostat may, however, be connected to and operate a valve device controlling the air supply or a part thereof.

In the drawings, referring to the form of Figs. 1 and 2, 2 represents the exhaust pipe or manifold of an explosive engine, and 3 the air inlet pipe leading to the carbureter or charge former. 4 is the thermostat which in this form is a cone of thermostatic material, such as two dissimilar metals soldered or secured together and split to form a series of fingers. When cold, these fingers are relatively close together, with the slits between of relatively small size. This cone is secured within an air inlet passage 5, extending through the exhaust pipe or manifold and leading to the main air inlet pipe 3. The cone may be secured in contact with the wall of the passage or may have portions projecting through it into contact with the hot exhaust gases. When the parts are cold, this thermostatic valve will choke down the air sucked in during starting and thus give a rich mixture. As the engine starts and the exhaust gases heat up the exhaust channel, the fingers will expand as shown in Fig. 2, thus increasing the air supply and affording a proper mixture during normal running. The area of air inlet is thus dependent on the temperature of the air, and the temperature and volume of the exhaust gases. The device therefore also tends to correct the enriching of the mixture under higher suctions, giving a heat control of the mixture. If a pressure-controlled type of carbureter is used having a piston or equivalent device, the combination will give both automatic pressure and automatic heat control of the mixture, without further complicating the carbureter or mixture former.

In Fig. 3, the thermostat takes the form of a bar $4^a$, the free end of which is connected to the stem 6 of an air valve 7, controlling the main or a supplemental air supply to the charge former. The other end is secured to a cross bracket 8, fastened within the exhaust passage.

In Fig. 4, the thermostatic bar $4^b$ is fastened to one side of the exhaust channel $2^b$, and carries a valve or choke device 9, within the air flow suction channel $5^b$.

In all these forms, the air suction channel crosses over from the carbureter side of the engine to the exhaust side, to bring the air control and thermostat into proximity. In the bar form, amplifying connections, such as multiplying levers, may be interposed between the thermostats and the valve or choke device to give a greater movement of the latter, if desired.

The simple form of Figs. 1 and 2 may also be used to control the temperature of the cooling water used for the engine jackets. In Fig. 5, I show the thermostatic cone placed in the connection leading from the engine jacket to the radiator. When the water is relatively cold, the cone will choke the flow and thus hold the water within the engine jacket. As the water becomes hotter, the cone will open and allow a freer flow and thus greater circulation to the radiator. In this case, owing to the smaller ranges of temperature, the thermostatic cone should be made of such metals and so arranged as to give it greater movement through such range. In this relation, the thermostatic valve device may control either the main water flow connection or a bypass may be provided through which the water may flow without passing to the radiator, the thermostat controlling the relative currents of flow through each by its size of opening relative to the bypass opening.

The advantages of my invention will be apparent to those skilled in the art, since a simple, cheap and easily applied device is afforded which will automatically heat-control the air supply to the charge former, giving easy starting and tending to reduce over-richness of the mixture on greater suctions when more air is needed. As a water control, it tends to keep the engine at its most efficient temperature.

The form of the thermostat may be varied; adjustments may be used between it and the valve, when the latter is used; its connections may be changed; it may be heated by the engine cylinder or heated parts connected thereto, and other changes may be made without departing from my invention.

I claim:

1. An explosive engine having a fuel inlet pipe provided with a charge former and an air inlet through which air is continuously sucked by the engine while running, and a thermostatic device adjacent to the engine exhaust and in conductive heat relation thereto additionally to any heating thereof from the air drawn in and arranged to control at all times the volume of air sucked in through said air inlet to the fuel pipe, substantially as described.

2. An explosive engine having a fuel inlet pipe provided with a charge former and an air inlet through which air is continuously sucked by the engine while running, and a thermostatic choke device having a part thereof located in said air inlet and adjacent to the engine exhaust and in conductive heat relation thereto additionally to any heating thereof from the air drawn in, said device controlling at all times the volume of air sucked in through said air inlet, substantially as described.

3. An explosive engine having a flow-channel connected therewith and through which fluid is continuously moved by the engine while running, and a thermostat formed as a choke device located within said flow-channel and continuously controlling the flow of fluid therethrough while the engine is running by the different positionings of said thermostatic device under the different temperatures to which it is subjected, substantially as described.

In testimony whereof, I have hereunto set my hand.

C. P. BYRNES.

Witnesses:
W. C. LYON,
H. M. CORWIN.